US010037505B2

(12) United States Patent
Williams

(10) Patent No.: US 10,037,505 B2
(45) Date of Patent: Jul. 31, 2018

(54) SYSTEM AND METHOD FOR PROCESSING AND DYNAMICALLY SEGREGATING BUSINESS ASSETS

(71) Applicant: John Legaré Williams, Newark, DE (US)

(72) Inventor: John Legaré Williams, Newark, DE (US)

( * ) Notice: Subject to any disclaimer, the term of this patent is extended or adjusted under 35 U.S.C. 154(b) by 480 days.

(21) Appl. No.: 14/497,474

(22) Filed: Sep. 26, 2014

(65) Prior Publication Data

US 2015/0088615 A1 Mar. 26, 2015

Related U.S. Application Data

(60) Provisional application No. 61/882,886, filed on Sep. 26, 2013.

(51) Int. Cl.
*G06Q 10/06* (2012.01)
*G06Q 50/18* (2012.01)
*G06Q 10/08* (2012.01)

(52) U.S. Cl.
CPC ....... *G06Q 10/0637* (2013.01); *G06Q 10/087* (2013.01); *G06Q 50/18* (2013.01)

(58) Field of Classification Search
CPC combination set(s) only.
See application file for complete search history.

(56) References Cited

U.S. PATENT DOCUMENTS 6,430,542 B1 * 8/2002 Moran ............... G06Q 30/02
705/35
8,073,735 B2 12/2011 Libman
8,311,863 B1 * 11/2012 Kemp ............... G06Q 10/0639
705/7.11

(Continued)

OTHER PUBLICATIONS

Riser, et al., "Chapter 20—Domestic COPEs and Series, LLC" from book entitled Asset Protection, 2004 (7 pages).

(Continued)

*Primary Examiner* — Thomas L Mansfield
(74) *Attorney, Agent, or Firm* — McCarter & English, LLP

(57) ABSTRACT

Systems and methods for protecting business assets are provided. More specifically, provided herein is a system for protecting business assets, comprising a Series LLC computer system in electronic communication with one or more third party computer systems over a network to electronically receive asset information and liability information therefrom, an asset database in electronic communication with the Series LLC computer system, the asset database populated with the asset information received from the one or more third party computer systems, a liability database in electronic communication with the Series LLC computer system, the liability database populated with the liability information received from the one or more third party computer systems, a Series LLC management engine executed by the Series LLC computer system to automatically create Series LLC data by processing the asset information and the liability information to dynamically segregate business assets and liabilities, and a user interface engine of the Series LLC computer system to generate a user interface to present Series LLC data to a user.

47 Claims, 8 Drawing Sheets

(56) References Cited

U.S. PATENT DOCUMENTS

| | | | | |
|---|---|---|---|---|
| 8,396,769 | B1* | 3/2013 | Selig | G06Q 40/06 705/35 |
| 8,442,883 | B2 | 5/2013 | Rashid | |
| 8,930,253 | B1* | 1/2015 | Ball | G06Q 40/00 705/35 |
| 2002/0194008 | A1 | 12/2002 | Yang et al. | |
| 2003/0158874 | A1* | 8/2003 | Graham | G06Q 10/10 |
| 2005/0055297 | A1* | 3/2005 | Gordon | G06Q 40/02 705/35 |
| 2007/0265853 | A1 | 11/2007 | Hall et al. | |
| 2007/0299751 | A1* | 12/2007 | Jenkins | G06Q 30/04 705/31 |
| 2009/0157565 | A1 | 6/2009 | Breck | |
| 2009/0216566 | A1 | 8/2009 | Thompson | |
| 2009/0275396 | A1 | 11/2009 | Felice | |
| 2010/0088244 | A1* | 4/2010 | Frank | G06Q 10/10 705/310 |
| 2011/0153492 | A1* | 6/2011 | Gainor | G06Q 20/10 705/39 |
| 2012/0059675 | A1 | 3/2012 | Ricciardi et al. | |
| 2012/0322543 | A1 | 12/2012 | Felice | |
| 2013/0173454 | A9 | 7/2013 | Gainor et al. | |
| 2014/0244317 | A1* | 8/2014 | Roberts | G06Q 40/08 705/4 |
| 2014/0279526 | A1* | 9/2014 | Jackson | G06Q 20/405 705/44 |

OTHER PUBLICATIONS

Borden, et al., "Series LLCs in Real Estate Transactions," from Real Property, Trust, and Estate Law Journal, 2011 (14 pages).
Conaway, "A Business Review of the Delaware Series: Good Business for the Informed," the Fouth Annual Symposium on the Law of Delaware Business Entities, Delaware State Bar Association, May 29-30, 2008 (44 pages).
Donn, et al., "Series, LLC," Delaware State Bar Association 4th Annual Symposium of the Law of Delaware Business Entites, May 30, 2008 (48 pages).
Conaway, "A Business Review of the Delaware Series: Good Business for the Informed," PowerPoint presenation presented at the 4th Annual Symposium of the Law of Delaware Business Entities, May 30, 2008 (9 pages).
Gattuso, "Series LLCs Let's Give the Frog a Little Love." Business Law Today, Jul./Aug. 2008 (5 pages).
Gerson, "Tax Management Memorandum Taxing Series LLCs," Bna Tax Management, vol. 45, No. 4, Feb. 23, 2004 (28 pages).
Hanson, "Business Law LLC Potpourri," Illinois Bar Journal, Illinois State Bar Association, Nov., 2005 (2 pages).
Walberg, et al., "Series LLCs in Business and Tax Planning," The Tax Adviser, Jan., 2010 (7 pages).
Harner, et al., "Series LLCs: What Happens When One Series Fails? Key Considerations and Issues," Business Law Today, American Bar Association Business Law Section, Feb. 22, 2013 (7 pages).
Jacobson, "Series Llc Plumbing Issues," ABA LLC Institute, Fall 2014 (11 pages).
Jetel, et al., "The Alarming Potential for Foreclosure and Dissolution by an LLC Members Personal Creditors," Probate & Property, May/Jun. 2006 (7 pages).
Kleinberger, "Series of Unincorporated Business Entities: The Construct, the Import, the Recent Activity of the Uniform Law Commission, and the Issues on the Table," Series Article, 2014 (8 pages).
Murray, "A Real Estate Practitioner's Guide to Delaware Series LLCs (With Form)," 2007 (41 pages).
Rutledge, "The Internal Affairs Doctrine and Limited Liability of Individual Series Within a Series LLC," Business Entities, May/Jun. 2015 (7 pages).
Terry, et al., "110 Tax Notes 1093—An Initial Inquiry into the Federal Tax Classification of Series Limited Liability Companies," Tax Analysts Tax Notes, Mar. 6, 2006 (11 pages).

Sparkman, "Frontier Issues of Series LLCs. Tax Issues, Secretary of State Issues, and Issues of Going Out-of-State," LLCs, Partnerships and Unincorporated Entities Committee 2012 LLC Institute, Oct. 18-19, 2012 (21 pages).
Sparkman, "Series LLCs in Interstate Commerce," Business Law Today, American Bar Association Business Law Section, Feb. 22, 2013 (8 pages).
Sparkman, "Tax Aspects of Series LLCs," Business Law Today, American Bar Association Business Law Section, Feb. 22, 2013 (9 pages).
Blake, "From the Offshore World of International Finance to Your Backyard: Structuring Series LLCs for Diverse Business Pruposes," DePaul Business & Commercial Law Journal, Fall, 2010 (20 pages).
Dawson, "Series LLC and Bankruptcy: When the Series Finds Itself in Trouble, Will it Need Its Parent to Bail it Out?" Delaware Journal of Corporate Law (DJCL), vol. 35, No. 2, (2010) (17 pages).
Rutledge, "Again, for the Want of a Theory: The Challenge of the "Series" to Business Organization Law," American Business Law Journal, vol. 46, No. 2, (2009) (21 pp.).
Peterson, "Unlimited Potential or Uncertain Future: Series LLCs and Intra-Family Wealth Transfers," Journal of Law & Family Studies (2007) (12 pages).
Outenreath, "Taxation of Series LLCs in Texas: Bigger Isn't Always Better in the Lone Star State," St. Mary's Law Journal, vol. 45 Issue 2, Jul. 2014 (44 pages).
Mertens, "Who Owns Your Body?" Student Note and Comment: Series Limited Liability Companies: A Possible Solution to Multiple LLCS, Chicago Kent Law Review (2009) (31 pages).
McFadin, "You Can't Always Count How You Want: Why Texas Series LLCS Do Not Offer a Unique Advantage to Employers Who Wish to Avoid the Affordable Care Act's Employer Madate," Texas Tech Law Review (2014) (27 pages).
Kray, "Respecting the Concept and Limited Liability of a Series LLC in Texas," St. Mary's Law Journal (2011) (32 pages).
Howard, "Where Do We Go From Here? a Survey of Series LLCs in Texas in Light of the Proposed Federal Tax Classification for the Organization," Baylor Law Review (2011) (21 pages).
Hiller, "But Series-LY, Folks"—The Series Laws, and How They (May) Intersect With Bankruptcy Law, American Bankruptcy Institute Law Review (2012) (16 pages).
Goforth, "The Series LLC, and a Series of Difficult Questions," Arkansas Law Review (2007) (14 pages).
Gingerich, "Series LLCS: The Problem of the Chicken and the Egg," Entrepreneurial Business Law Journal (2009) (21 pages).
Fink, "The Series LLC: Suggestions for Surviving Some Serious Uncertainties," University of Pittsburgh Law Review (2011) (14 pages).
Fezzi, "Third Time's a Charm: How the Uniform Law Commission Can Fit Series LLCs Into the Uniform Limited Liability Company Act," Saint Louis University School of Law (2014) (21 pages).
Borkus, et al., "Series LLCs: Practical Pointers and Tax Implications," Illinois Bar Journal, vol. 95, Jan. 2007 (5 pages).
Conaway, et al., "The Delaware Series LLC: Sophisticated and Flexible Business Planning," Michigan Business & Entreprenurial Law Review, vol. 2, Issue 1 (2012) (39 pages).
Kleinberger, "Series of Unincorporated Business Entities: The Mobius Strip and Klein Bottle of Business Entity Law," Business Law Today, Feb. 2015 (4 pages).
Bahena, "Series LLCs: the Asset Protection Dream Machines?" The Journal of Corporation Law, Jun. 22, 2010 (31 pages).
Rutledge, "The Man Who Tells You He Understands Series Will Lie to You About Other Things as Well," State Law & State Taxation Corner, Journal of Passthrough Entities, Mar.-Apr. 2013 (10 pages).
Jakobsze, "Seriously Considering Series LLCs," The Journal of the DuPage County Bar Association, vol. 23 (2010-11) (3 pages).
International Search Report of the International Searching Authority dated Mar. 19, 2015, issued in connection with International Application No. PCT/US14/57600 (6 pages).
Written Opinion of the International Searching Authority dated Mar. 19, 2015, issued in connection with International Application No. PCT/US14/57600 (6 pages).

* cited by examiner

SYSTEM AND METHOD FOR PROCESSING AND DYNAMICALLY SEGREGATING BUSINESS ASSETS

CROSS-REFERENCE TO RELATED APPLICATIONS

This application claims the benefit of U.S. Provisional Application Ser. No. 61/882,886 filed on Sep. 26, 2013, the entire disclosure of which is expressly incorporated herein by reference.

BACKGROUND

Field of the Disclosure

The present disclosure relates to a system and method for protecting business assets through dynamic segregation of business assets and liabilities. More specifically, the present disclosure relates to a system and method for dynamically forming, funding, maintaining and terminating Cells within a Series Limited Liability Company or any other form of a protected cell company.

Related Art

A Series Limited Liability Company ("Series LLC") is a form of a limited liability company where the assets of each series of a Series LLC are protected from liabilities arising from the other series therein. In states with enabling legislation for a Series LLC, each series ("Cell") of a Series LLC can own distinct assets, incur separate liabilities, contract in its own name, have its own Operating Agreement, and have different managers and members, but only the Series LLC (and not each Cell therein) must file a single certificate of formation and pay a single annual state fee in the state of formation, regardless of the limitless number of Cells therein.

Despite the advantages (e.g., unlimited asset segregation potential, cost savings, etc.) of a Series LLC, especially compared with a similarly structured set of separately formed traditional LLCs, there are still a number of contract costs and administrative burdens associated with forming, maintaining, and terminating separate Cells in a Series LLC. Current systems require an arduous process of drafting, and having members sign, "separate series agreements" to form, fund, maintain, and terminate Cells of a Series LLC.

Therefore, there is a need for a system and method that can dynamically form, fund, maintain separate records, and terminate Cells easily and efficiently.

SUMMARY

The present disclosure relates to a system and method for forming business or asset holding Cells. More specifically, the system (e.g., Series LLC Cell computer system, a Series LLC computer system, etc.) allows a user to define and create one or more Cells, and then (manually or automatically) assign assets and/or liabilities to the one or more Cells. The system provides (automatic or manual) asset/liability population, characterization, information access, Operating Agreements, maintenance of records, and alteration. The system receives asset information and/or liability information (in real-time), and automatically updates (in real-time) information across one or more Cells. A user can track any changes made to the Cells, identify and analyze assets and/or liabilities of a Cell, study the interaction of Cells within or outside the Series LLC, and spin off, modify, terminate, or add on Cells.

BRIEF DESCRIPTION OF THE DRAWINGS

The foregoing features of the disclosure will be apparent from the following Detailed Description, taken in connection with the accompanying drawings, in which.

DETAILED DESCRIPTION

Figure 1:
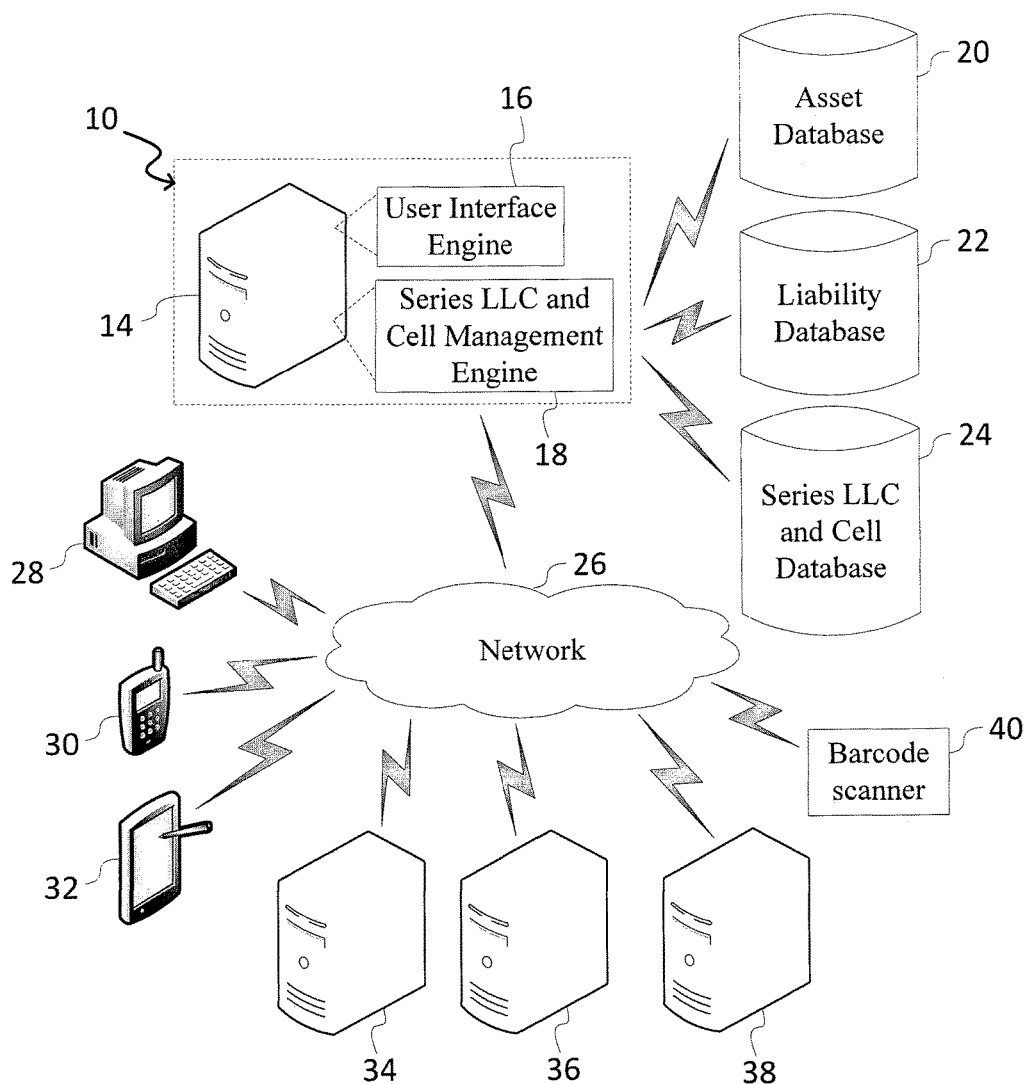
FIG. 1 is a diagram showing the system of the present disclosure.

The present disclosure relates to a system and method for forming business entities and/or entity-like Cells, as discussed in detail below in connection with FIGS. 1-8.

As described in more detail below, the system and method can take individually identifiable assets, dynamically assign those assets to a particular Cell (e.g., Series), create a record of that Cell (and/or Series LLC), and treat those assets as separate from other business assets in the same Series LLC (e.g., maintain separate records of the Cell and/or Series LLC). This automates the process of creating Cell Operating Agreements, which could be stored electronically to document the creation and record of that Cell. The members of the Series LLC could further designate ownership interests in Cells therein with multiple tiers of owners who do not need to be mirror images of other Cells therein. While Operating Agreements or Cell agreements could be verbal or written, they could also be electronic and determined by the system (e.g., by a predetermined algorithm, dynamic algorithm, etc.) to assign ownership and management structures in real time. This granularizes a business into all its component parts where each part of the business can be in a separate Cell. In other words, the system separates a business into Cells that have rights tantamount to free-standing entities. However, these Cells work together and can interact with each other. Cells add economic value because of disaggregation and division. The system and method manage an unlimited number of component parts of an enterprise, whether active or passive, tangible or intangible, thereby making the Series LLC streamlined, organized, and easy to use.

The system of the present disclosure allows a user to define and create one or more Series Limited Liability Companies (Series LLCs) having one or more Cells, and then (manually or automatically) assign membership, management, assets, and/or liabilities to the one or more Cells. The system provides (automatic or manual) asset/liability population, characterization (e.g., description), information access, and alteration. As discussed below in more detail, the system receives (in real-time) asset information (e.g., inventory information) and/or liability information, and automatically updates (in real-time) information across one or more Cells. A user can track any changes made to the Cells, identify and analyze profitable areas of a business, and spin off, terminate, or add on with or without Secretary of State filings. Further, Cells can be backdated to be retroactively funded as assets or liabilities are acquired, funded from when they were acquired, or they can be future dated to when they expect to be acquired. The system can also designate membership, management, and terms to particular Cell agreements, and maintain Cell records.

The system allows users to isolate assets and/or liabilities (or their component parts) and track and organize them. Assets and/or liabilities can be isolated as geographic territories or items, and then assigned to a Cell. Tangible and/or intangible assets and rights can have their own Cells (e.g., employees, orders, customers, contractors, pieces of equipment, types of inventory, pieces of inventory, etc.). Contracts can be isolated so that each item or product (e.g., bought, sold, held, watched, etc.) can be isolated and have its own Cell. This is regardless of whether the item of a company or contract is a product, service, natural object, or man made object. Anything that can be geographically located or identified and tracked can have its own series, such as inputs, elements (e.g., structural, design, mechanical, electrical), shares of stock, pieces of artwork, derivative contracts, component parts (e.g., component parts of intellectual property), etc.

The system could be used by any type of user, company (e.g., selling products or services, holding assets, manufacturing, trading, etc.), or other organization (e.g., business, non-profit, non-government organization (NGO), individuals, partnerships, entities, governments, etc.). For example, the system could be utilized by banks to avoid commingling certain deposits with high risk liabilities (e.g., to avoid deposits in a bank from being aggregated, fungible, and exposed to unwanted risks where internal bookkeeping in insufficient without the ring-fencing of being allocated and assigned to particular separate Cells) or by investors to invest in only a portion of a company's assets (e.g., only those assets assigned to a particular Cell, only those funds which are linked to a specific Cell, etc.) or by a leasing company to mitigate risks by creating a separate lessor Cell to enter into leases for each particular piece of equipment.

FIG. 1 is a diagram showing the system of the present disclosure, indicated generally at 10. The system 10 comprises a computer system 14 (e.g., a server) having a user interface engine 16 and a Series LLC and Cell management engine (module) 18 stored therein. The system 14 is in electronic communication with one or more databases, such as an asset database 20, a liability database 22, and/or a Series LLC and Cell database 24 (e.g., Series LLC database). Each database could be stored on the computer system 14, or located externally (e.g., in a separate database server in communication with the system 10). As will be discussed in greater detail below, the Series LLC and Cell management engine 18 allows users to electronically create and manage Series LLCs and Cells, as well as assets and liabilities thereof.

The computer system 14 could be any suitable computer server (e.g., a server with an INTEL microprocessor, multiple processors, multiple processing cores) running any suitable operating system (e.g., Windows by Microsoft, Linux, etc.). The computer system 14 includes non-volatile storage, which could include disk (e.g., hard disk), flash memory, read-only memory (ROM), erasable, programmable ROM (EPROM), electrically-erasable, programmable ROM (EEPROM), or any other type of non-volatile memory. The Series LLC and Cell management engine 18, discussed in greater detail below, could be embodied as computer-readable instructions stored in computer-readable media (e.g., the non-volatile memory mentioned above), and programmed in any suitable programming language (e.g., C, C++, Java, etc.).

The system 10 can communicate through a network 26 with one or more servers, users and/or devices. Network communication could be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, e-mails, electronic data interchange (EDI) messages, extensible markup language (XML) messages, file transfer protocol (FTP) file transfers, etc.), or any other suitable wired or wireless electronic communications format.

The system 10 could be web-based and could allow for remote access to the system 10 over a network 26 (e.g., Internet, WAN, LAN, etc.) by one or more devices, such as a personal computer system 28, a smart cellular telephone 30, a tablet computer 32, or other devices. It is also contemplated that at least some of the functionality of the system 10 could run locally on devices (e.g., personal computer 28, smart cellular telephone 30, tablet computer 32, etc.) programmed with software in accordance with the present disclosure. Further, the system 10 could communicate with an inventory management system 34 (to receive therefrom and/or update information therein regarding the inventory of a Series LLC and/or Cells therein), an investor computer system 36 (to receive therefrom and/or update information therein regarding the valuation of an asset or group of assets of a Series LLC and/or Cells therein), and/or a government computer system 38 (to receive information therefrom and/or update information therein regarding regulatory filings or other reporting requirements of a Series LLC, Cells, and/or assets therein). Further, as discussed in more detail below, the system 10 could communicate with a barcode scanner 40 or other similar device that uniquely identifies products.

Figure 2:
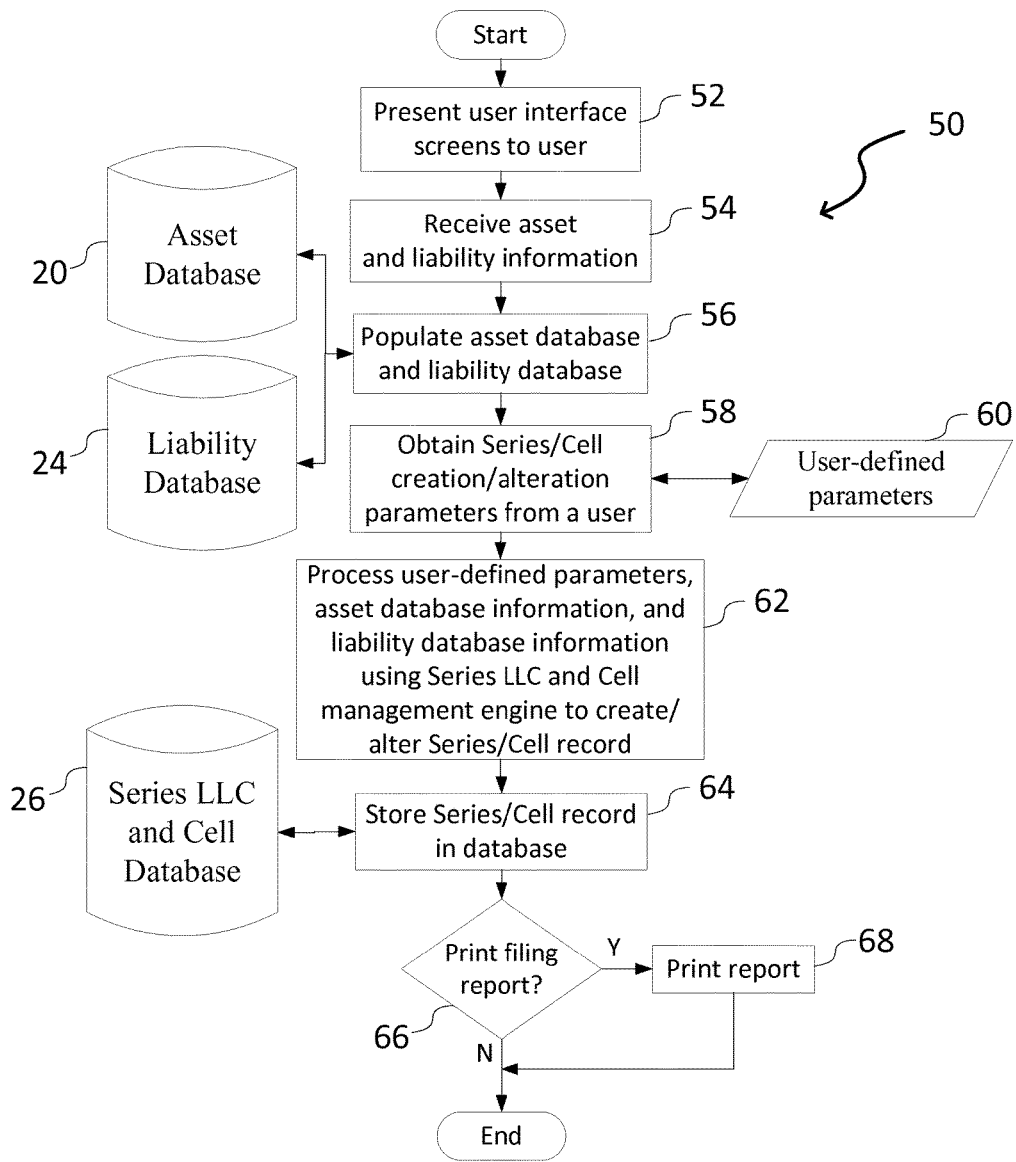
FIG. 2 is a flowchart showing overall processing steps carried out by the system of the present disclosure.

FIG. 2 is a flowchart showing overall processing steps 50 carried out by the system of the present disclosure. In step 52, the system electronically presents one or more user interface screens to a user. In step 54, the system receives asset and/or liability information, such as from the user (e.g., remote user), an inventory management system, an investor computer system, and/or a government computer system. Then in step 56, the received asset and liability information is used to populate an asset database 20 and liability database 24. In step 58, the system obtains Cell creation/alteration parameters 60 as input from the user. The Cell creation/alteration parameters could include the name of the Cell, name of the business as a whole (e.g., parent business), designation of the class(es) of assets to be assigned to the Cell, description of the characteristics (e.g., outer limits) of each Cell, naming convention (e.g., descriptive, non-descriptive, encrypted, etc.), determination of Cell management, approximation of series number, description of contents of series, etc. However these parameters could also be determined automatically by the system instead.

In step 62, described in more detail below in FIG. 3, the system 10 processes the user-defined parameters, the asset database information (if any), and the liability database information (if any) using the Series LLC management engine to create/alter a Cell record (e.g., create/alter Series LLC data). If a new Cell record is created the system could be requested to generate an Operating Agreement for the new Cell. In step 64, the Cell record is stored in the Series LLC and Cell database 26. In step 66, the system determines whether a report should be printed for filing (e.g., filing with the state departments). Each state has its own rules regarding the formation and reporting requirements of a Series LLC, although the state of incorporation governs the internal affairs, such as Delaware, which allows Cells to be set up without additional filing fees. The system can compile those rules and automatically create the documents needed for filing to comply with state regulations. In this way, the system makes a determination when a series is created/altered as to the regulatory and/or tax impact of the series and any licensing and/or reporting requirements, outputs the results to the user, and creates an Operating Agreement for the Cell and any required paperwork for filing. If a positive determination is made in step 66, then the process proceeds to step 68, and the report is printed. Otherwise the process ends. Alternatively, or additionally, the system could generate a user interface screen (e.g., by a user interface engine of the computer system) for presenting Series LLC information (e.g., Cell information, asset information, and/or liability information associated with the Series LLC and/or one or more Cells) to a user.

Figure 3:
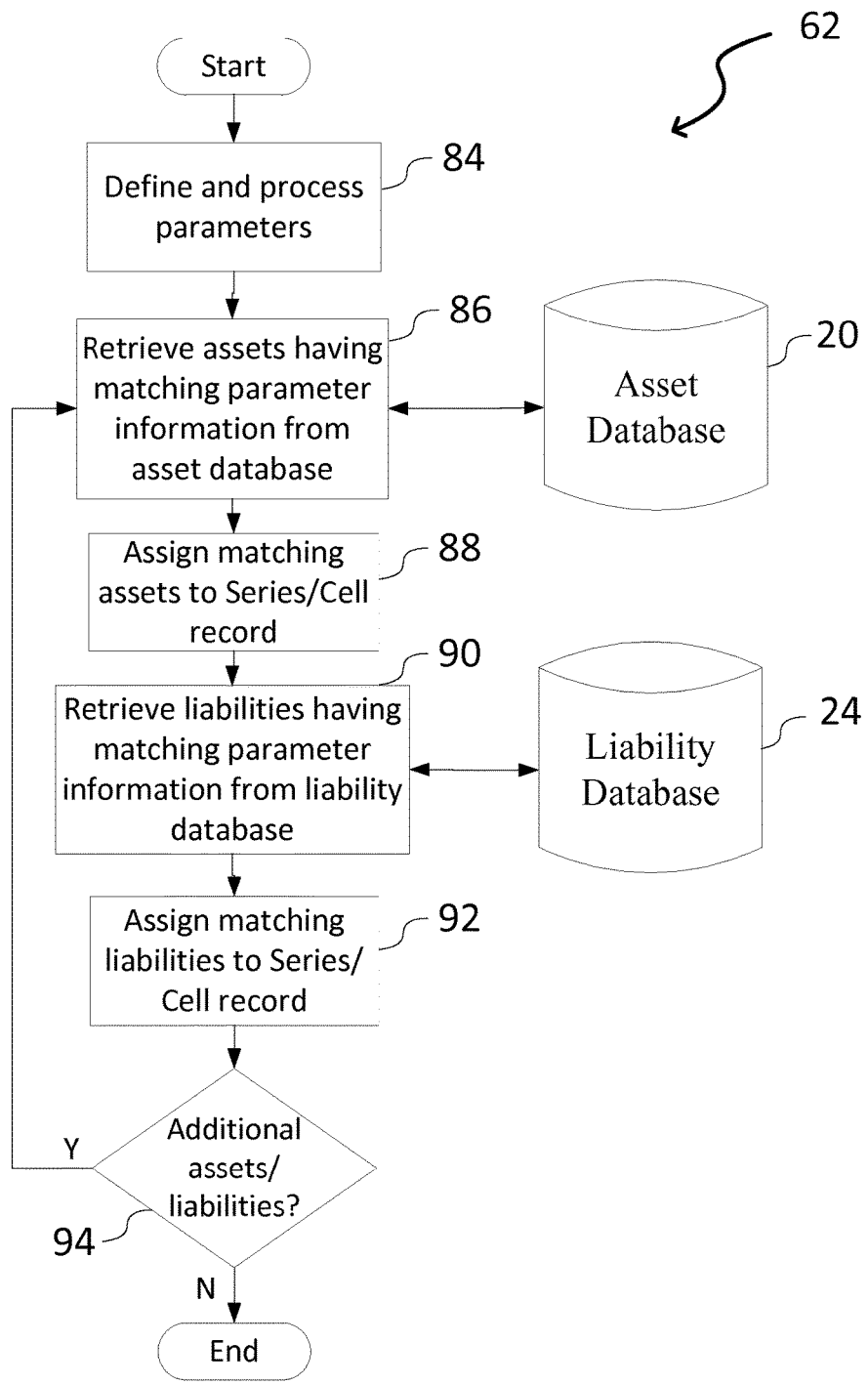
FIG. 3 is a flowchart showing in more detail a processing step of FIG. 2.

FIG. 3 is a flowchart showing in more detail step 62 of FIG. 2. More specifically, shown is a flowchart showing the steps for processing user-defined parameters, asset database information, and liability database information using the Series LLC and Cell management engine to create a Cell record. In step 84, parameters for the Cells are defined (e.g., number of Cells) and processed, including defining and processing geographic locations. For example, for a national store, all of the zip codes in the country could be entered so that each series has its own zip code, and conversely each zip code has its own series. Any asset or liability geographically located in a particular zip code could be added to a particular Cell (e.g., series) for that zip code. Additionally, new Cells or classes of Cells could be added or subtracted based on the processed information.

Then in step 86, assets that have matching parameter information (e.g., zip codes) are retrieved from the asset database 20. In step 88, the retrieved matching assets are assigned to a Cell record. In step 90, liabilities that have matching parameter information (e.g., zip codes) are retrieved from the liability database 24. In step 92, the retrieved matching liabilities are assigned to a Cell record. In step 94, a determination is made as to whether there are any additional assets and/or liabilities. If so, the process proceeds to back to step 86. Otherwise, the process ends. In some situations, the system could automatically wind down or terminate a Cell based on the processed parameters and/or user input.

Figure 4:
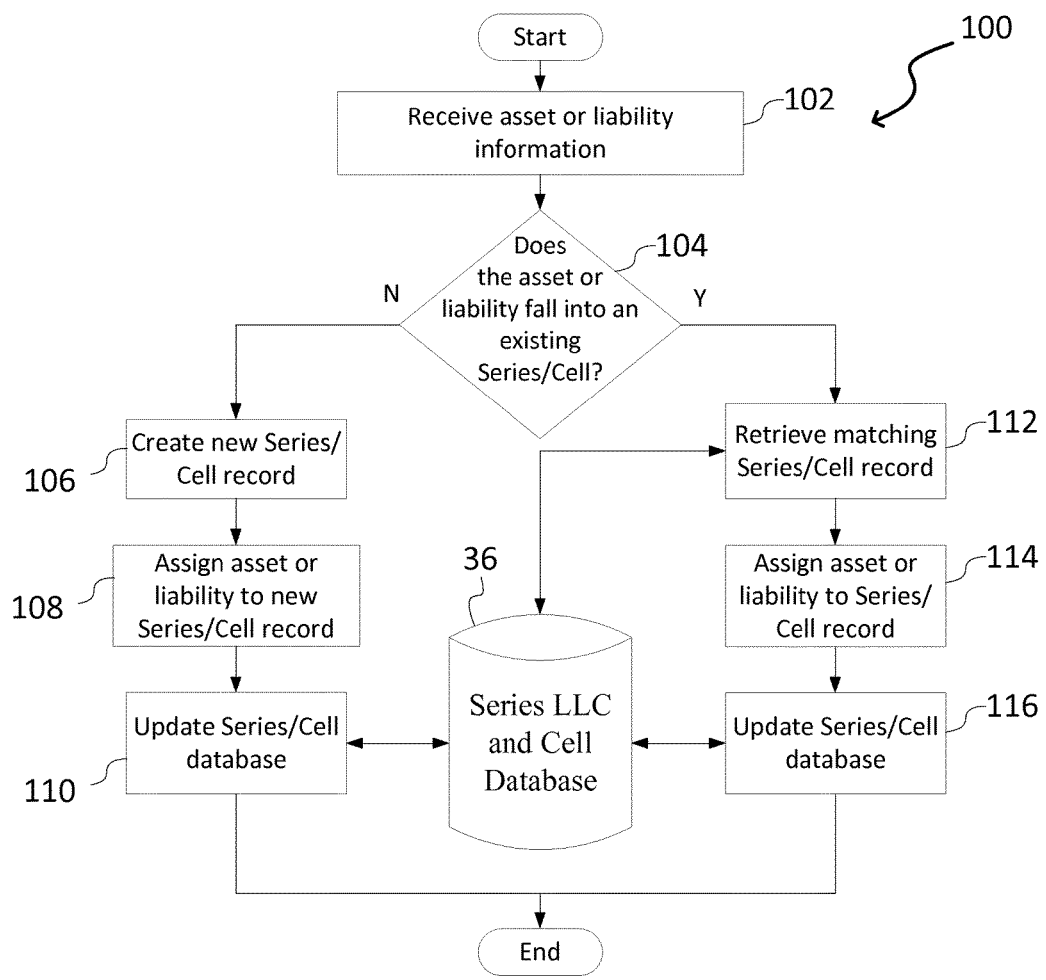
FIG. 4 is a flowchart showing processing steps for managing assets and/or liabilities in real-time.

FIG. 4 is a flowchart showing the processing steps 100 for managing assets and/or liabilities in real-time. In step 102, the system receives, in real-time, asset (e.g., inventory) or liability information for a particular Series LLC and/or Cell, such as from a third party computer system. In step 104, the system determines whether the asset or liability falls into an existing Cell of a Series LLC. If not, the process proceeds to step 106, and the system creates a new Cell record for the asset or liability and generates an Operating Agreement for the new Cell. In step 108, the asset or liability is assigned to a new Cell record. Then in step 110, the Series LLC and Cell database is updated with the new Cell record. If, in step 104, the asset or liability falls into an existing series, the process proceeds to step 112, where the system retrieves the matching Cell record from the Series LLC database 36. In step 114, the system assigns the asset or liability to the Cell record. Then in step 116, the Series LLC database 36 is updated with the revised Cell record.

Figure 5:
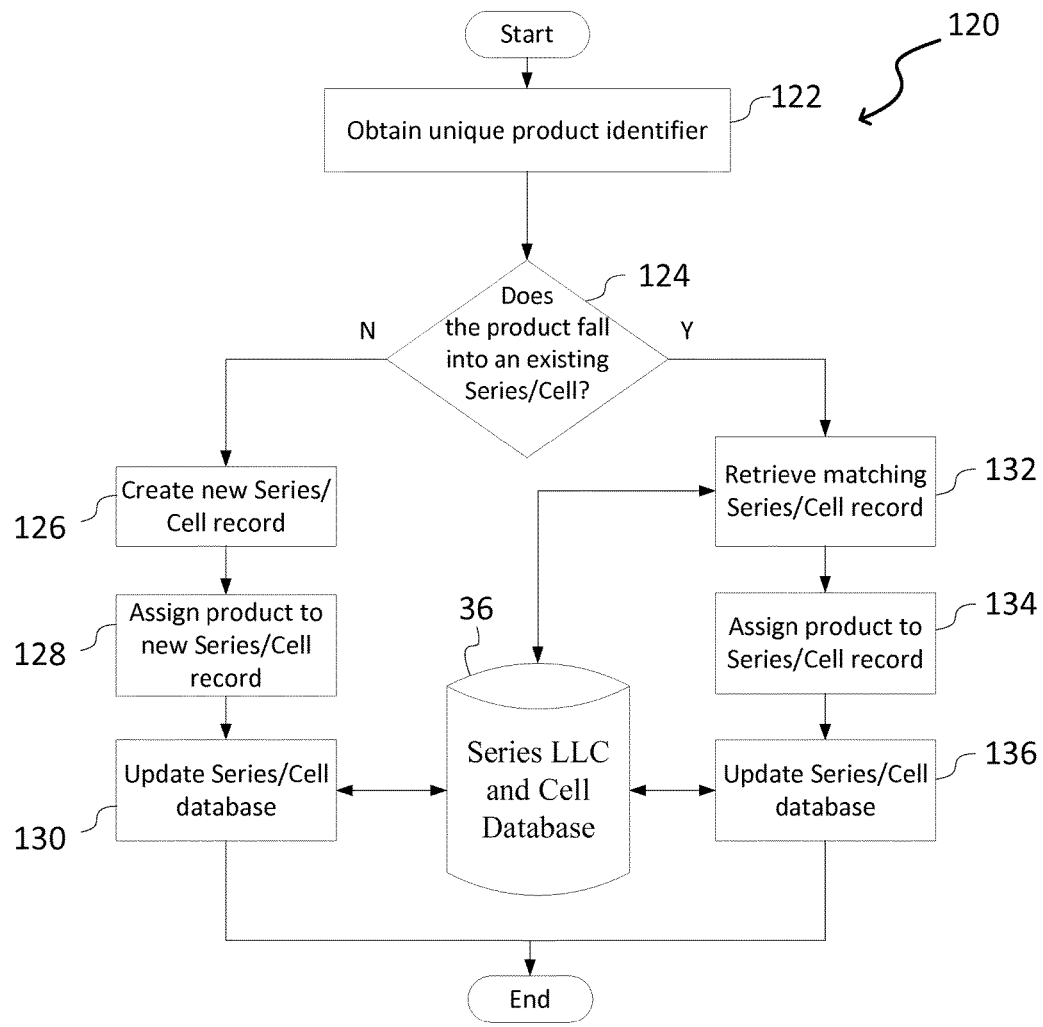
FIG. 5 is a flowchart showing the processing steps for managing products in real-time.

FIG. 5 is a flowchart showing the processing steps 120 for managing products in real-time. In step 122, the system electronically receives, in real-time, unique product information (e.g., unique product identifier), such as from a bar code scan or serial number (automatically electronically transmitted or manually entered by a user). In step 124, the system determines whether the product falls into an existing Cell of a Series LLC. If not, the process proceeds to step 126, and the system creates a new Cell record for the product and generates an Operating Agreement for the new Cell. In step 128, the product is assigned to a new Cell record. Then in step 130, the Series LLC database is updated with the new Cell record. If, in step 124, the asset or liability falls into an existing Cell of a Series LLC, the process proceeds to step 132, where the system retrieves the matching Cell record from the Series LLC and Cell database 36. In step 134, the system assigns the product to the Cell record. Then in step 136, the Series LLC and Cell database 36 is updated with the revised Cell record. For example, a store (e.g., drug store) can track assets (e.g., products) in a series by bar codes or other unique identifiers.

Figure 6:
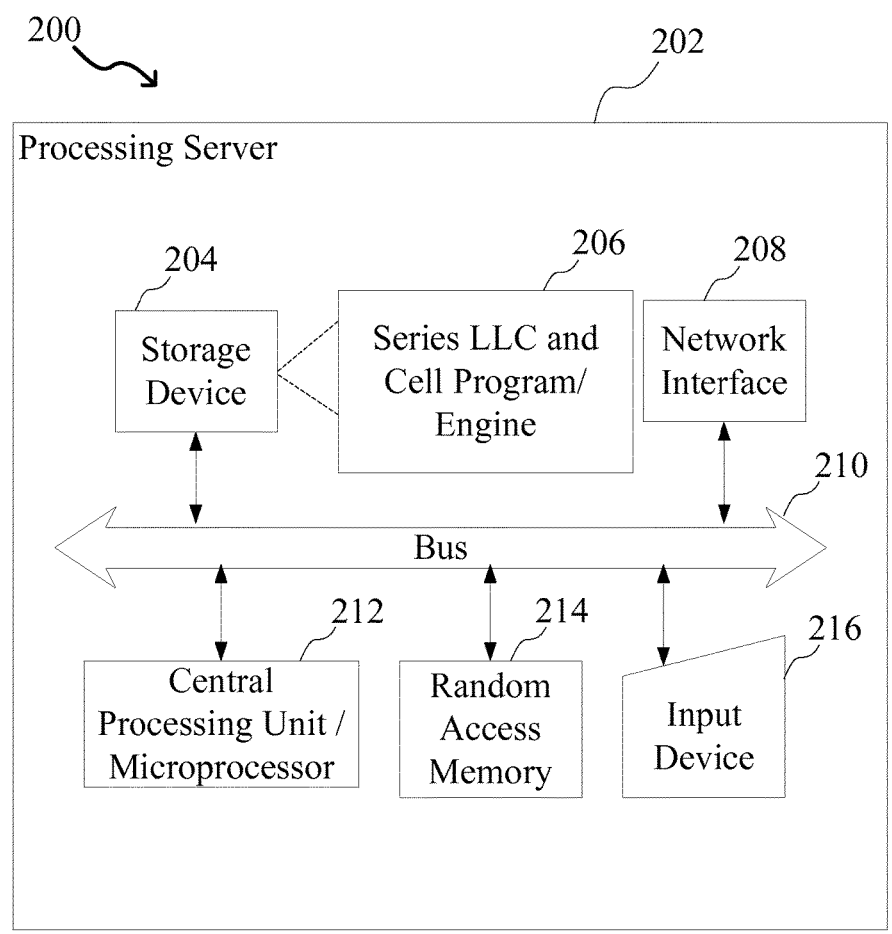
FIG. 6 is a diagram showing hardware and software components of a computer system capable of performing the processes of the present disclosure.

FIG. 6 is a diagram showing hardware and software components of a computer system 200 of the present disclosure capable of performing the processes discussed above. The system 200 comprises a processing server 202 which could include a storage device 204, a network interface 208, a communications bus 210, a central processing unit (CPU) (microprocessor) 212, random access memory (RAM) 214, and one or more input devices 216, such as a keyboard, mouse, etc. The server 202 could also include a display (e.g., liquid crystal display (LCD), cathode ray tube (CRT), etc.). The storage device 204 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The server 202 could be a networked computer system, a personal computer, a smart phone, tablet computer etc. It is noted that the server 202 need not be a networked server, and indeed, could be a stand-alone computer system.

The functionality provided by the present disclosure could be provided by a Series LLC and Cell program/engine 206, which could be embodied as computer-readable program code stored on the storage device 204 and executed by the CPU 212 using any suitable, high or low level computing language, such as Python, Java, C, C++, C#, .NET, MATLAB, etc. The network interface 208 could include an Ethernet network interface device, a wireless network interface device, or any other suitable device which permits the server 202 to communicate via the network. The CPU 212 could include any suitable single- or multiple-core microprocessor of any suitable architecture that is capable of implementing and running the program 206 (e.g., Intel processor). The random access memory 214 could include any suitable, high-speed, random access memory typical of most modern computers, such as dynamic RAM (DRAM), etc.

Figure 7:
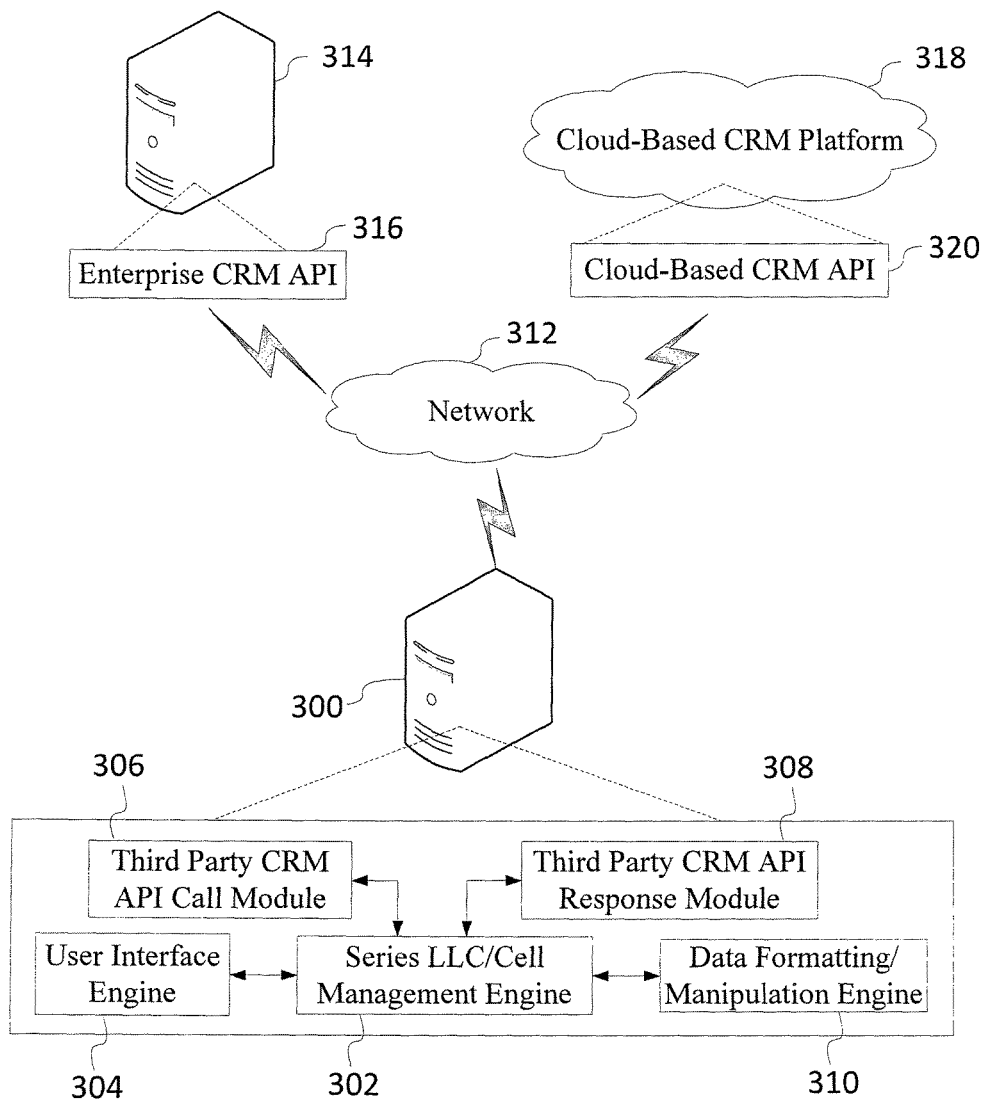
FIG. 7 is a diagram showing another embodiment of the system of the present disclosure, wherein the system operates with one or more Customer Relations Management computer systems.

FIG. 7 is a diagram showing another embodiment of the system of the present disclosure, wherein the system operates with one or more Customer Relations Management (CRM) computer systems (e.g., platforms). Advantageously, the system 300 could operate on a real-time basis with one or more CRM systems of a company or entity. Such CRM systems track, on a real-time basis, enterprise-wide asset information (e.g., inventory) for a company/entity, such as products in inventory, products sold, etc. Accordingly, as disclosed herein in connection with FIG. 7, the system 300 could include software modules/components and associated network/cloud connectivity to such CRM systems so that the system 300 generates/receives Series LLC information in real-time in response to real-time asset information stored and dynamically updated by CRM systems.

The system 300 could be cloud based and could have a user interface engine 304 and a Series LLC/Cell Management Engine 302 in communication with one another (as described above). Further, the system 300 could be accessible to one or more user computer systems over a network 312 as a mobile app, a website, and/or a computer software program.

The system 300 could include a Third Party Customer Relations Management (CRM) Module, a Third Party CRM Application Programming Interface (API) Module, and a Data Formatting Manipulation Engine. The system could be in electronic communication over a network 312 with an Enterprise CRM Computer System 314 (e.g., Quickbooks), wherein the Enterprise CRM Computer System could have an Enterprise CRM API 316. Further the system 300 could be in electronic communication over a network 312 with a Cloud-Based CRM Platform 318 (e.g., Salesforce), wherein the Cloud-Based CRM Platform 318 could have a Cloud-Based CRM API 320.

Accordingly, the Third Party CRM API Call Module 306 of the system 300 could initiate an electronic call (e.g., request, query, etc.) over the network 312 to the Enterprise CRM API 316 and/or the Cloud-Based CRM API 320. The Third Party CRM API Response Module 308 could then receive an electronic response over the network 312 from the Enterprise CRM API 316 and/or the Cloud-Based CRM API 320. Similarly, the Enterprise CRM API 316 and/or the Cloud-Based CRM API 320 could automatically forward information to the system 300. The Data Formatting/Manipulation Engine 310 could then extract information (and/or data) within the response (and/or forwarded information) and format and/or manipulate the information into a format to be used by the system 300 (e.g., format into cells of an Excel spreadsheet). In other words, the Data Formatting/Manipulation Engine 310 adopts data from one or more CRMs into a common format to be used by the Series LLC/Cell Management Engine 302.

In this way, the system 300 has continuous access to (and/or monitoring of) the real-time inventory of corporations (and/or users). The system 300 could be automated such that when the system 300 receives a notification of additional inventory, a change of inventory, or any other information, the system 300 could update the related Series LLC (e.g., by a document automation module). More specifically, the system 300 could continuously monitor CRM systems to automatically create and/or file any required government paperwork to update the Series LLC and/or Cell. For example, the system 300 could create a Series LLC and/or Cell for each CRM object (e.g., pre-defined system objects built into a platform), Custom Object (e.g., created by platform developers), and/or piece of inventory. Further, the system 300 can file for domestic and/or foreign entities with the appropriate state government. For example, the system 300 could file a Delaware Series LLC or Cell as a foreign entity with the appropriate foreign country.

Figure 8:
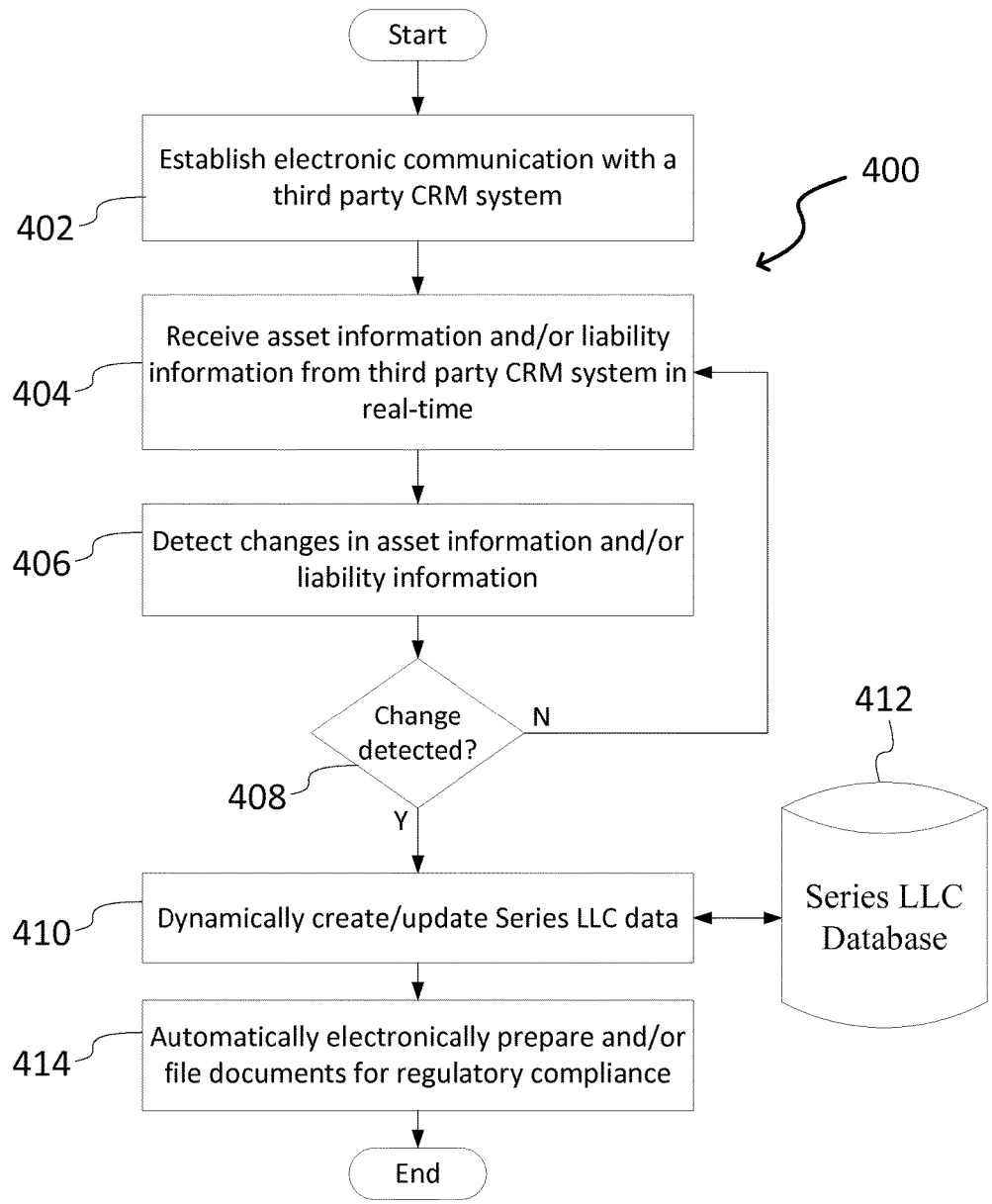
FIG. 8 is a flowchart showing the processing steps for electronically communicating with one or more Customer Relations Management systems to dynamically update/manage asset information and/or liability information in real-time.

FIG. 8 is a flowchart showing the processing steps 400 carried out by the Series LLC computer system for electronically communicating with one or more Customer Relations Management systems to dynamically update/manage asset information and/or liability information in real-time. In step 402, a Series LLC computer system establishes electronic communication with one or more third party CRM systems. In step 404, the Series LLC computer system receives asset information and/or liability information from the one or more third party CRM systems in real-time. In step 406, the Series LLC computer system searches for and detects any changes in asset information and/or liability information. In step 408, the Series LLC computer system determines whether any changes were detected. If no changes were detected, then the process reverts to step 404, and the Series LLC computer system continues to monitor asset information and/or liability information for any changes. If changes were detected, then the process proceeds to step 410, and the Series LLC computer system dynamically updates Series LLC information (e.g., with a Series LLC database 412), such as was discussed above with respect to FIG. 4. In step 414, the Series LLC computer system (optionally) automatically electronically prepares and/or files documents for regulatory compliance.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A system for protecting business assets, comprising:
a Series LLC computer system in electronic communication with one or more third party computer systems over a network to electronically receive asset information therefrom;
an asset database in electronic communication with the Series LLC computer system, the asset database populated with the asset information received from the one or more third party computer systems;
a Series LLC management engine executed by the Series LLC computer system and programmed to automatically create Series LLC data by processing the asset information to dynamically segregate business assets;
a user interface engine of the Series LLC computer system to generate a user interface to present Series LLC data to a user; and
a data formatting manipulation engine in electronic communication with the Series LLC management engine for formatting Series LLC information received from the one or more third party computer systems;
wherein the one or more third party computer systems includes a Customer Relations Management (CRM) computer system having real-time asset information, and the Series LLC computer system receives and processes the real-time asset information in real-time;
wherein the data formatting manipulation engine receives data from the one or more third party computer systems and based on an analysis of the data from the one or more third party computer systems, the data formatting manipulation engine creates a common format compatible with the one or more third party computer systems and that can be used by the Series LLC computer system; and wherein, based upon a change to the Series LLC data, the Series LLC management engine automatically generates a document to satisfy regulatory compliance.

2. The system of claim 1, further comprising a liability database in electronic communication with the Series LLC computer system, the liability database populated with liability information received from the one or more third party computer systems.

3. The system of claim 1, wherein the real-time asset information comprises product inventory.

4. The system of claim 1, wherein the one or more third party computer systems includes a government computer system and the Series LLC computer system continuously monitors the CRM computer system to automatically create and file required government paperwork with the government computer system.

5. The system of claim 1, wherein creating Series LLC data comprises creating a new Series LLC record.

6. The system of claim 1, wherein creating Series LLC data comprises creating a new Cell record of a Series LLC.

7. The system of claim 6, wherein the Series LLC management engine generates an Operating Agreement for the new Cell record.

8. The system of claim 7, wherein the Series LLC management engine stores the Operating Agreement in a Series LLC database in electronic communication with the Series LLC computer system.

9. The system of claim 1, wherein creating Series LLC data comprises updating Series LLC data.

10. The system of claim 9, wherein updating Series LLC data comprises altering a Series LLC record.

11. The system of claim 9, wherein updating Series LLC data comprises altering a Cell record of a Series LLC.

12. A method for protecting business assets, comprising the steps of:
- electronically receiving, at a Series LLC computer system, asset information from one or more third party computer systems over a network;
- electronically populating, by the Series LLC computer system, an asset database with the asset information received from the one or more third party computer systems;
- automatically creating, by a Series LLC management engine executed by the Series LLC computer system, Series LLC data by processing the asset information to dynamically segregate business assets;
- generating, by a user interface engine of the Series LLC computer system, a user interface to present Series LLC data to a user;
- providing a data formatting manipulation engine in electronic communication with the Series LLC management engine for formatting Series LLC information received from the one or more third party computer systems;
- providing a Customer Relations Management (CRM) computer system as one of the one or more third party computer systems, the CRM computer system having real-time asset information, and the Series LLC computer system receiving and processing the real-time asset information in real-time;
- receiving data from the one or more third party computer systems via the data formatting manipulation engine, the data formatting manipulation engine analyzing the data from the one or more third party computer systems and creating a common format compatible with the one or more third party computer systems and that can be used by the Series LLC computer system; and
- automatically generating a document to satisfy regulatory compliance based upon a change to the Series LLC data.

13. The method of claim 12, further comprising electronically populating, by the Series LLC computer system, a liability database with liability information received from the one or more third party computer systems.

14. The method of claim 12, wherein the real-time asset information comprises product inventory.

15. The method of claim 12, further comprising the step of providing a government computer system and the Series LLC computer system continuously monitors the CRM computer system to automatically create and file required government paperwork with the government computer system.

16. The method of claim 12, wherein creating Series LLC data comprises creating a new Series LLC record.

17. The method of claim 12, wherein creating Series LLC data comprises creating a new Cell record of a Series LLC.

18. The method of claim 17, further comprising generating, by the Series LLC management engine, an Operating Agreement for the new Cell record.

19. The method of claim 18, further comprising storing, by the Series LLC management engine, the Operating Agreement in a Series LLC database in electronic communication with the Series LLC computer system.

20. The method of claim 12, wherein creating Series LLC data comprises updating Series LLC data.

21. The method of claim 20, wherein updating Series LLC data comprises altering a Series LLC record.

22. The method of claim 20, wherein updating Series LLC data comprises altering a Cell record of a Series LLC.

23. A non-transitory computer-readable medium having computer-readable instructions stored thereon which, when executed by a Series LLC computer system, cause the computer system to perform the steps of:
- electronically receiving, at the Series LLC computer system, asset information from one or more third party computer systems over a network;
- electronically populating, by the Series LLC computer system, an asset database with the asset information received from the one or more third party computer systems;
- automatically creating, by a Series LLC management engine executed by the Series LLC computer system, Series LLC data by processing the asset information to dynamically segregate business assets and liabilities;
- generating, by a user interface engine of the Series LLC computer system, a user interface to present Series LLC data to a user;
- providing a data formatting manipulation engine in electronic communication with the Series LLC management engine for formatting Series LLC information received from the one or more third party computer systems;
- providing a Customer Relations Management (CRM) computer system as one of the one or more third party computer systems, the CRM computer system having real-time asset information, and the Series LLC computer system receiving and processing the real-time asset information in real-time;
- receiving data from the one or more third party computer systems via the data formatting manipulation engine, the data formatting manipulation engine analyzing the data from the one or more third party computer systems and creating a common format compatible with the one or more third party computer systems and that can be used by the Series LLC computer system; and automatically generating a document to satisfy regulatory compliance based upon a change to the Series LLC data.

24. The computer-readable medium of claim 23, further comprising electronically populating, by the Series LLC computer system, a liability database with liability information received from the one or more third party computer systems.

25. The computer-readable medium of claim 23, wherein the real-time asset information comprises product inventory.

26. The computer-readable medium of claim 23, further comprising the step of providing a government computer system and the Series LLC computer system continuously monitors the CRM computer system to automatically create and file required government paperwork with the government computer system.

27. The computer-readable medium of claim 23, wherein creating Series LLC data comprises creating a new Series LLC record.

28. The computer-readable medium of claim 23, wherein creating Series LLC data comprises creating a new Cell record of a Series LLC.

29. The computer-readable medium of claim 28, further comprising generating, by the Series LLC management engine, an Operating Agreement for the new Cell record.

30. The computer-readable medium of claim 29, further comprising storing, by the Series LLC management engine, the Operating Agreement in a Series LLC database in electronic communication with the Series LLC computer system.

31. The computer-readable medium of claim 23, wherein creating Series LLC data comprises updating Series LLC data.

32. The computer-readable medium of claim 31, wherein updating Series LLC data comprises altering a Series LLC record.

33. The computer-readable medium of claim 31, wherein updating Series LLC data comprises altering a Cell record of a Series LLC.

34. A system for protecting business assets, comprising:
a Series LLC computer system in electronic communication with one or more Customer Relations Management (CRM) computer systems over a network to electronically receive real-time inventory information therefrom;
an asset database in electronic communication with the Series LLC computer system, the asset database populated with the real-time inventory information received from the one or more CRM computer systems;
a Series LLC management engine executed by the Series LLC computer system and programmed to monitor the real-time inventory information, automatically detect changes in the real-time inventory information, and dynamically update Series LLC data of a Series LLC if changes are detected;
a data formatting manipulation engine in electronic communication with the Series LLC management engine for formatting Series LLC information received from the CRM computer systems;
wherein the data formatting manipulation engine receives data from the CRM computer systems and based on an analysis of the data from the CRM computer systems, the data formatting manipulation engine creates a common format compatible with the CRM computer systems and that can be used by the Series LLC computer system; and
wherein, based upon a change to the Series LLC data, the Series LLC management engine automatically generates a document to satisfy regulatory compliance.

35. The system of claim 34, further comprising a liability database in electronic communication with the Series LLC computer system, the liability database populated with liability information received from the one or more third party computer systems.

36. The system of claim 34, wherein the Series LLC management engine automatically determines whether to create documents to file for regulatory compliance.

37. The system of claim 34, wherein updating Series LLC data comprises creating a new Cell record for the Series LLC.

38. The system of claim 34, wherein updating Series LLC data comprises altering a Cell record of a Series LLC.

39. The system of claim 34, wherein the Series LLC computer system further comprises a third party CRM API call module in electronic communication with the Series LLC management engine and a third party CRM API.

40. The system of claim 34, wherein the Series LLC computer system further comprises a third party CRM API response module in electronic communication with the Series LLC management engine and a third party CRM API.

41. A method for protecting business assets, comprising:
electronically receiving, at a Series LLC computer system, real-time inventory information from one or more customer relations management (CRM) computer systems over a network;
electronically populating, by the Series LLC computer system, an asset database with the real-time inventory information received from the one or more CRM computer systems;
monitoring, by a Series LLC management engine executed by the Series LLC computer system, the real-time inventory information;
automatically detecting, by the Series LLC management engine, changes in the real-time inventory information;
dynamically updating, by the Series LLC management engine, Series LLC data of a Series LLC if changes are detected;
providing a data formatting manipulation engine in electronic communication with the Series LLC management engine for formatting Series LLC information received from the CRM computer systems;
receiving data from the CRM computer systems via the data formatting manipulation engine, the data formatting manipulation engine analyzing the data from the CRM computer systems and creating a common format compatible with the CRM computer systems and that can be used by the Series LLC computer system; and
automatically generating a document to satisfy regulatory compliance based upon a change to the Series LLC data.

42. The method of claim 41, further comprising electronically populating, by the Series LLC computer system, a liability database with liability information received from the one or more third party computer systems.

43. The method of claim 41, further comprising automatically determining, by the Series LLC management engine, whether to create documents to file for regulatory compliance.

44. The method of claim 41, wherein updating Series LLC data comprises creating a new Cell record for the Series LLC.

45. The method of claim 41, wherein updating Series LLC data comprises altering a Cell record of a Series LLC.

46. The method of claim 41, further comprising electronically communicating, by a third party CRM API call module of the Series LLC computer system, with the Series LLC management engine and a third party CRM API.

47. The method of claim 41, further comprising electronically communicating, by a third party CRM API response module of the Series LLC computer system, with the Series LLC management engine and a third party CRM API.

* * * * *